US012614651B2

(12) United States Patent
Tabuse

(10) Patent No.: US 12,614,651 B2
(45) Date of Patent: Apr. 28, 2026

(54) MICROWAVE DEVICE

(71) Applicants: Nikkiso Co., Ltd., Tokyo (JP); Katsuyoshi Tabuse, Osaka (JP)

(72) Inventor: Katsuyoshi Tabuse, Osaka (JP)

(73) Assignee: Nikkiso Co., Ltd., Tokyo (JP)

( * ) Notice: Subject to any disclaimer, the term of this patent is extended or adjusted under 35 U.S.C. 154(b) by 140 days.

(21) Appl. No.: 18/497,647

(22) Filed: Oct. 30, 2023

(65) Prior Publication Data

US 2024/0105361 A1 Mar. 28, 2024

Related U.S. Application Data

(63) Continuation of application No. PCT/JP2022/023051, filed on Jun. 8, 2022.

(30) Foreign Application Priority Data

Aug. 4, 2021 (JP) ................................ 2021-128221

(51) Int. Cl.
*A61B 18/18* (2006.01)
*H01B 11/00* (2006.01)
*H01B 11/18* (2006.01)
*H01P 3/06* (2006.01)

(52) U.S. Cl.
CPC ....... *H01B 11/1834* (2013.01); *H01B 11/002* (2013.01); *H01P 3/06* (2013.01)

(58) Field of Classification Search
CPC ..................................................... A61B 18/18
See application file for complete search history.

(56) References Cited

U.S. PATENT DOCUMENTS 5,368,592 A * 11/1994 Stern ................. A61M 25/0147 604/95.05
7,826,904 B2 * 11/2010 Appling ................. A61N 5/045 607/116
8,080,009 B2 * 12/2011 Lee .................... A61B 18/1477 606/41

FOREIGN PATENT DOCUMENTS

JP 2018011994 A 1/2018
WO 2015025934 A1 2/2015
WO 2020049283 A1 3/2020

OTHER PUBLICATIONS

International Search Report for Application No. PCT/JP2022/023051 dated Aug. 16, 2022 (with translation).

* cited by examiner

*Primary Examiner* — Chau N Nguyen
(74) *Attorney, Agent, or Firm* — Farber LLC

(57) ABSTRACT

A microwave device capable of increasing an amount of heat generated at the tip end thereof. The microwave device having a central conductor that transmits microwaves, an insulator covering the central conductor, and an external conductor covering the insulator. The central conductor is exposed to the outside from a tip end of a microwave irradiation part for the first time, and an externally exposed part of the exposed central conductor is bent toward the base end side of the microwave emitting unit so as to be along the external conductor.

2 Claims, 4 Drawing Sheets

MICROWAVE DEVICE

FIELD OF THE INVENTION

The present invention relates mainly to a microwave device used in a surgical instrument.

BACKGROUND OF THE INVENTION

Microwaves are known to be capable of coagulating (immobilizing) biological tissues such as digestive organs, liver, pancreas, kidneys, adrenal glands, bladder, prostate, uterus, ovaries, bones, blood vessels, and intestines at low temperatures (e.g., 100° C. or less). Therefore, by utilizing this characteristic, for example, as described in Japanese Published Unexamined Patent Application No. JP 2018-11994, it is known that a bloodless ablation for coagulation and hemostasis of biological tissues can be performed by providing a surgical instrument with a function capable of radiating microwaves. Furthermore, coagulation therapy for tumors has become widespread as a minimally invasive therapy using an omnidirectional monopole antenna for deeper coagulation.

In the microwave surgical instrument described in Patent Document 1, microwaves can be transmitted to a tapered tip of a coaxial body and the microwaves are radiated from the entire central conductor exposed in a longitudinal direction by decreasing a sectional area of a central conductor and a sectional area of an external conductor gradually or in a step-by-step manner with a ratio between the sectional area of the central conductor and the sectional area of the external conductor being kept constant.

SUMMARY OF THE INVENTION

In the microwave surgical instrument as described above, since the central conductor is exposed in the longitudinal direction, there are problems that a large amount of heat is generated at the base end of the central conductor and a small amount of heat is generated at the tip end. That is, microwaves are radiated from the part where the central conductor is exposed to the outside, the energy of the radiated microwaves becomes attenuated from the base end of the central conductor toward the tip end. Therefore, there is a problem that the amount of heat generated at the base end of the central conductor is large and the amount of heat generated at the tip end thereof is small. Therefore, when the above-described microwave surgical instruments are used to coagulate biological tissue and stop bleeding, the amount of heat generated at the frequently used tip end portion is small, so there is a possibility that the coagulation and hemostasis of the biological tissues may not be performed successfully.

In this regard, the above problem becomes more pronounced when the shape of the microwave surgical instrument is enlarged. That is, when the shape of the microwave surgical instrument is enlarged, the central conductor is also enlarged, accordingly the energy of the radiated microwaves is significantly attenuated, thereby the amount of heat generated at the tip end becomes smaller, and coagulation and hemostasis of the biological tissues may not be performed successfully. Therefore, there is a problem that the shape of the microwave surgical instrument has design limitations. This is also the same problem for a tumor coagulation treatment using an omnidirectional monopole antenna for deeper coagulation.

Therefore, in view of the above problems, an object of the present invention is to provide a microwave device capable of increasing the amount of heat generated at the tip end portion thereof.

The foregoing object of the present invention is achieved by the following means. It is noted that reference signs in the embodiments to be described hereinafter are added in parentheses, but the present invention is not intended to be limited thereto.

The microwave device according to an embodiment of the invention is a microwave device (1) capable of radiating microwaves, comprising a central conductor (21) that transmits microwaves, an insulator (22) covering the central conductor (21), and an external conductor (23) covering the insulator (22). The central conductor (21) is exposed to the outside from a tip end portion (the tip end 20*a* of the microwave irradiation part 20) of the microwave device (1) for the first time, and an externally exposed part (21*a*) of the central conductor (21) exposed is bent toward a base end side (base end 20*b* of the microwave irradiation part 20) of the microwave device (1) so as to be along the external conductor (23). Only on the external conductor (23) a concave slit (23*a*) is formed along the axial direction of the external conductor (23) and on the concave slit (23*a*) the externally exposed part (21*a*) of the central conductor (21) that is bent is arranged.

Further, the microwave device according to an embodiment of the invention has a slit (23*a*) toward the base end side (base end 20*b* of the microwave irradiation part 20) formed on an external conductor (23), and on the slit (23*a*) the externally exposed part (21*a*) of the central conductor (21) is arranged.

Furthermore, in the microwave device according to an embodiment of the invention the externally exposed part (21*a*) of the central conductor (21) is bent so as not to come into contact with the external conductor (23).

Next will be described advantageous effects of the present invention with reference signs in the drawings. It is noted that reference signs in the embodiments to be described hereinafter are added in parentheses, but the present invention is not intended to be limited thereto.

According to the first aspect of the present invention, the central conductor (21) is exposed to the outside from the tip end portion (the tip end 20*a* of the microwave irradiation part 20) for the first time, and the externally exposed part (21*a*) of the exposed central conductor (21) is bent toward the base end side (the base end 20*b* of the microwave irradiation part 20) of the microwave device (1) so as to be along the external conductor (23). As a result, the amount of heat generated by microwaves at the tip end portion (the tip end 20*a* of the microwave irradiation part 20) of the microwave device (1) can be increased compared to the conventional case.

According to the first aspect of the invention, only on the external conductor (23) the concave slit (23*a*) is formed along the axial direction of the external conductor (23), and on the slit (23*a*) the externally exposed part (21*a*) of the central conductor (21) that is bent is arranged, thereby the directivity of microwaves can be controlled. As a result, when the tip end portions of the microwave device (1) hold biological tissues, microwaves are applied to a specific portion of the biological tissues, so that coagulation and hemostasis of a biological tissues can be performed acutely.

Furthermore, according to the third aspect of the invention, the externally exposed part (21*a*) is bent so as not to come into contact with the external conductor (23), thereby preventing microwaves from becoming a loop antenna-like state, and preventing a situation in which biological tissues are not radiated with microwaves.

DETAILED DESCRIPTION OF THE INVENTION

Hereinafter, one embodiment of a microwave device according to the present invention will be specifically described with reference to the drawings. It is noted that, in the following description, up/down and left/right directions shall be referred to as up/down and left/right directions when viewed from the front of the figure.

Figure 1:
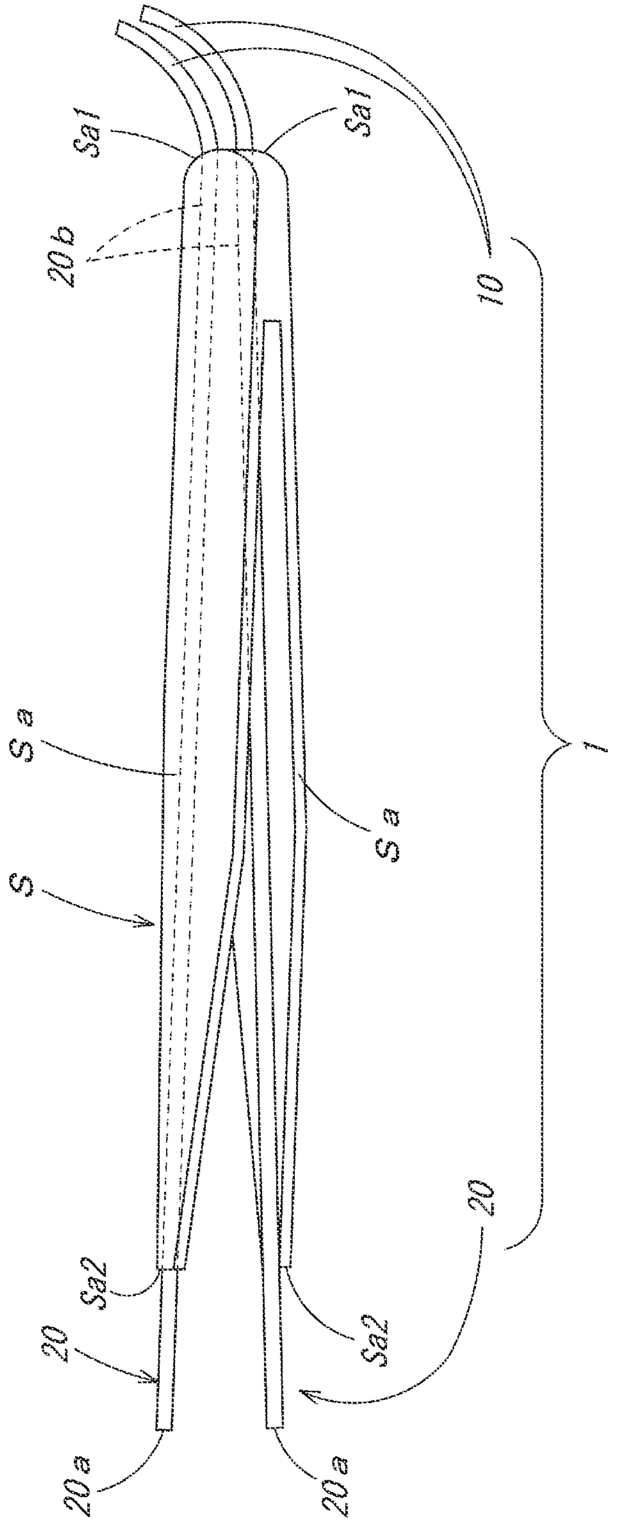
FIG. 1 is a perspective view of a microwave device according to an embodiment of the present invention when the microwave device is applied to a surgical instrument consisting of a thumb forceps-type instrument.

As an example of the application of the microwave device according to the present embodiment, for example, an application to a surgical instrument consisting of a thumb forceps-type instrument as shown in FIG. 1 is exemplified. More specifically, as shown in FIG. 1, the surgical instrument S consisting of a thumb forceps-type instrument, is composed of a pair of long and thin elliptical surgical instrument bodies Sa with tapered tip end portions. The base ends Sa1 of the pair of surgical instrument bodies Sa are fixed to each other, and the tip ends Sa2 are open. As a result, the pair of surgical instrument bodies Sa can approach and separate from each other, and the pair of surgical instrument bodies Sa can be used to hold and release biological tissues.

Further, the surgical instrument S configured in this way is provided with a microwave device 1 as shown in FIG. 1. This microwave device 1 is composed of a microwave introduction part 10 and a microwave irradiation part 20, as shown in FIG. 1.

As shown in FIG. 1, the microwave introduction parts 10 are respectively provided on the base ends Sa1 side of the pair of surgical instrument bodies Sa, and the microwave introduction parts 10 are composed of a coaxial cable having a conventionally known structure consisting of an inner conductor, an insulator, and an external conductor coaxially. Thus, such microwave introduction parts 10 are connected to a microwave generator (not shown) or a branching filter provided in a microwave generator. As a result, microwaves generated by the microwave generator are introduced into the microwave introduction parts 10.

Figure 2A:
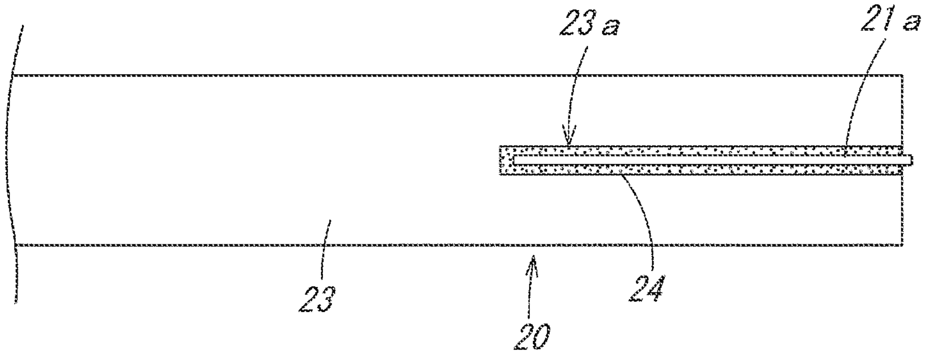
FIG. 2(*a*) is a plan view of the tip end of the microwave radiating part according to the same embodiment, FIG. 2(*b*) is a vertical cross-sectional view of the tip end of the microwave irradiation part according to the same embodiment, and FIG. 2(*c*) is a cross-sectional view along a line A-A shown in FIG. 2(*b*), FIG. 2(*d*-1) is a cross-sectional view along a line B-B shown in FIG. 2(*b*), and FIG. 2(*d*-2) is an enlarged view of the broken line X portion shown in FIG. 2(*d*-1).
Figure 2B:
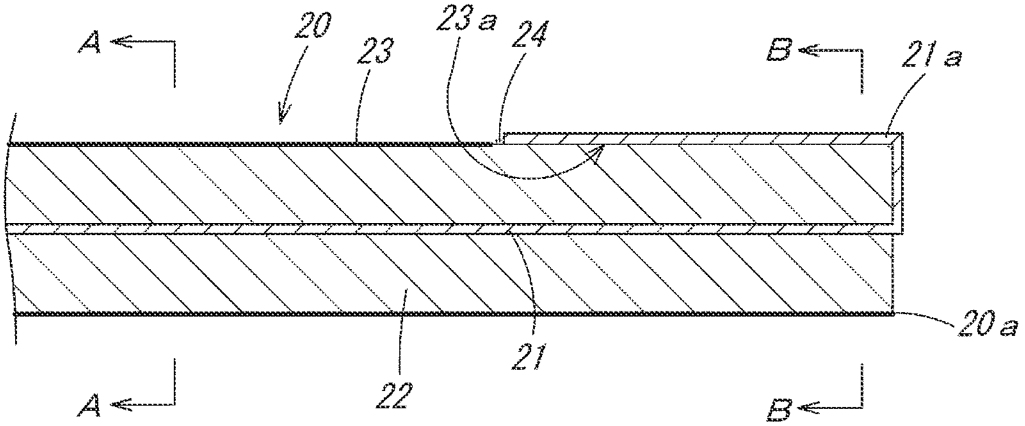
Figure 2:
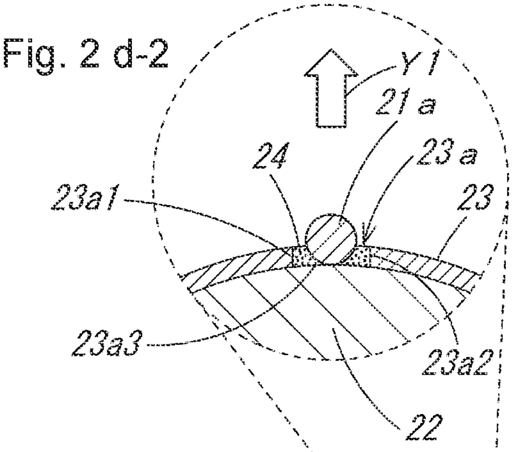
Figure 2C:
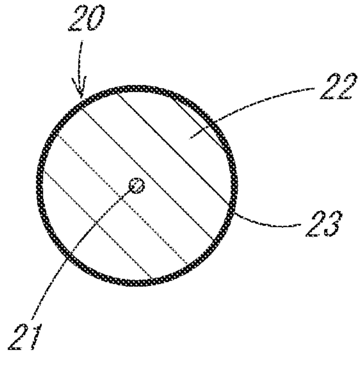
Figure 2:
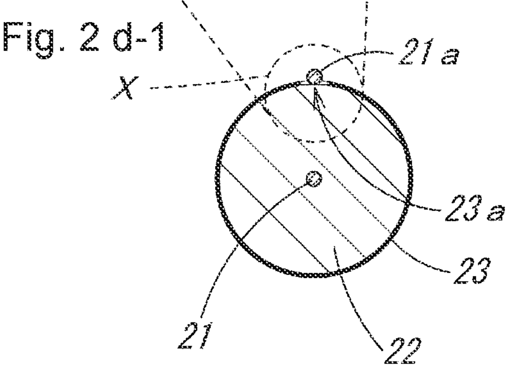

As shown in FIG. 1, the microwave irradiation parts 20 are respectively provided on the pair of surgical instrument bodies Sa so as to protrude from the tip ends Sa2 side of the pair of surgical instrument bodies Sa. As shown in FIG. 2(*c*), the microwave irradiation part 20 is composed of a coaxial cable consisting of the central conductor 21, the insulator 22, and the external conductor 23 arranged coaxially. The central conductor 21 is made of copper, bronze, aluminum, or the like, and has a circular shape in the cross-sectional view as shown in FIG. 2(*c*) and formed in a long rod-shape as shown in FIG. 2(*b*). Thus, such central conductor 21 is connected to or integrally formed with the inner conductor of the microwave introduction part 10. Thereby, microwaves introduced into the microwave introduction part 10 are transmitted to the central conductor 21.

As shown in FIG. 2(*c*), on the outer peripheral surface of the central conductor 21 as described above, the insulator 22 formed in a circular shape in the cross-sectional view is coated so as to be coaxial with the central conductor 21. Furthermore, as shown in FIG. 2(*b*), the insulator 22 covers the outer peripheral surface of the central conductor 21 up to the tip end 20*a* of the microwave irradiation part 20 so that the central conductor 21 is not exposed to the outside. In addition, the insulator 22 is made of Teflon (registered trademark), ceramics, or the like.

As shown in FIG. 2(*c*), on the outer peripheral surface of the insulator 22 as described above, an external conductor 23 formed in a circular shape in the cross-sectional view is coated so as to be coaxial with the central conductor 21 and the insulator 22. Furthermore, as shown in FIG. 2(*b*), the external conductor 23 covers the outer peripheral surface of the central insulator 22 up to the tip end 20*a* of the microwave irradiation part 20 so that the insulator 22 is not exposed to the outside. In addition, the external conductor 23 is formed of a conductive material such as a metal mesh.

The central conductor 21 of the microwave irradiation part 20 configured as described above is exposed to the outside for the first time from the tip end 20*a* of the microwave irradiation part 20, as shown in FIG. 2(*b*). Then, as shown in FIG. 2(*b*), the externally exposed part 21*a* of the central conductor 21 exposed to the outside is bent along the external conductor 23 so as to extend toward the base end portion 20*b* of the microwave irradiation part 20 side (see FIG. 1). As a result, microwaves transmitted from the externally exposed part 21*a* that is exposed to the outside for the first time from the tip end 20*a* of the microwave irradiation part 20 to the central conductor 21 are radiated to the outside. Thereby, microwaves are radiated from the externally exposed part 21*a* that is bent along the external conductor 23 toward the base end 20*b* side of the microwave irradiation part 20 (see FIG. 1). Hence, microwaves are radiated from the microwave irradiation parts 20 respectively provided at positions facing the pair of surgical instrument bodies Sa, and by holding the biological tissues with the microwave irradiation part 20 of the pair of surgical instrument bodies Sa, not only can stopping bleeding and coagulating of the biological tissues be performed, but also coagulating can be performed while compressing separate biological tissues at the same time, thereby sealing of the biological tissues is achieved.

At this time, since the central conductor 21 is exposed to the outside for the first time from the tip end 20*a* of the microwave irradiation part 20, the amount of heat generated by microwaves at the tip end 20*a* can be increased compared to the conventional case. Therefore, since the amount of heat generated by microwaves at the tip end 20*a* which is frequently used is higher compared to the conventional case when the microwave irradiation part 20 holds the biological tissues, it is capable of reducing the possibility that coagulation and hemostasis of biological tissues will not be performed successfully.

Thus, as in the present embodiment, by simply configuring where the central conductor 21 is exposed to the outside for the first time from the tip end 20*a* of the microwave irradiation part 20 and is bent along the external conductor 23 so as to extend toward the base end portion 20*b* side of the microwave irradiation part 20 (see FIG. 1), the amount of heat generated by microwaves at the tip end 20*a* can be increased compared to the conventional case. Therefore, the length and thickness of the central conductor 21 can be freely designed according to the desired microwaves wavelength. Of course, it is also possible to make the thickness of the central conductor 21 covered with the insulator 22 and the externally exposed part 21*a* different.

Therefore, with a configuration like this embodiment, it is possible to solve the conventional problem of design limitations.

By the way, in this embodiment, as shown in FIGS. 2(*a*), (*b*), (*d*-1), and (*d*-2), the externally exposed part 21*a* is arranged on the slit 23*a* formed on the external conductor 23. This is for the following reasons.

That is, when the externally exposed part 21*a* is bent along the external conductor 23, microwaves radiated from the externally exposed part 21*a* become diffused to the surroundings without controlling the directivity of microwaves. Therefore, even if an attempt is made to acutely coagulate and stop bleeding of the biological tissues by holding the biological tissues with the microwave irradiation part 20, since microwaves are diffused in the surroundings, it is possible that the coagulation and hemostasis of the biological tissues may not be acutely performed.

Therefore, in this embodiment, it is configured so that the directivity of microwaves is controlled by forming the slit 23*a* on the external conductor 23 and arranging the externally exposed part 21*a* on the slit 23*a*. More specifically, as shown in FIGS. 2(*d*-1) and 2(*d*-2), the slit 23*a* is formed in a generally concave shape in cross-sectional view, in a state where a part of the external conductor 23 is cut away, and as shown in FIGS. 2(*a*) and 2(*b*), the slit 23*a* is provided in an elongated shape on one side surface (in the drawing shown on upper surface) of the external conductor 23 extending (from the tip end 20*a* side to the base end 20*b* side of the microwave irradiation part 20, see FIG. 1) in the axial direction of the external conductor 23. Further, as shown in FIG. 2(*d*-2), the external peripheral surface of the slit 23*a* is covered with an insulator 24 made of Teflon (registered trademark), ceramics, or the like. Thus, the externally exposed part 21*a* is arranged on the slit 23*a* formed in this way. As a result, when the externally exposed part 21*a* radiates the left wall surface 23*a*1 side of the slit 23*a* with microwaves as shown in FIG. 2(*d*-2), microwaves are cut off by the insulator 24 covering the left wall surface 23*a*1 side and an electric discharge due to microwaves is prevented. Furthermore, when the externally exposed part 21*a* radiates the right wall surface 23*a*2 side of the slit 23*a* with microwaves as shown in FIG. 2(*d*-2), microwaves are cut off by the insulator 24 covering the right wall surface 23*a*1 side and an electric discharge due to microwaves is prevented.

Furthermore, when the externally exposed part 21*a* radiates the bottom wall surface 23*a*3 side of the slit 23*a* with microwaves as shown in FIG. 2(*d*-2), microwaves are cut off by the insulator 24 covering the bottom wall surface 23*a*3 side and an electric discharge due to microwaves is prevented. Ultimately, therefore, microwaves are radiated in the direction of arrow Y1 (upward direction in the drawing) shown in FIG. 2(*d*-2) and thus the directivity of microwaves can be controlled. As a result, when the microwave irradiation parts 20 hold the biological tissues, specific portions of the biological tissues are radiated with microwaves, so that the coagulation and hemostasis of biological tissues can be performed acutely.

The reason why the outer peripheral surface of the slit 23*a* is covered with the insulator 24 as described above is to prevent the externally exposed part 21*a* and the external conductor 23 from coming into contact with each other. That is, when the externally exposed part 21*a* and the external conductor 23 are brought into contact with each other, microwaves radiated from the externally exposed part 21*a* will be in a state like a loop antenna in which microwaves only flow into the external conductor 23. Thereby it may cause a possibility that the biological tissues are not radiated with microwaves. Therefore, in this embodiment, when the externally exposed part 21*a* is bent along the external conductor 23, as shown in FIG. 2(*d*-2) the outer peripheral surface of the slit 23*a* is covered with the insulator 24 so that the externally exposed part 21*a* and the external conductor 23 will not be brought into contact with each other. As a result, the loop antenna-like state is prevented, and a situation in which the biological tissues are not radiated with microwaves is prevented.

According to the present embodiment described above, the amount of heat generated at the tip end portion can be increased.

It should be noted that the shapes and the like shown in this embodiment are merely examples, and various modifications and changes are possible within the scope of the gist of the invention described in the claims. For example, the shape of the microwave device 1 shown in this embodiment is merely an example, and any shape may be used. For example, in the microwave device 1 exemplified in this embodiment, the shape of the externally exposed part 21*a* can be changed to various shapes such as a fan shape, a rectangular shape, a triangular shape, or the like, other than the circular shape in the cross-sectional view.

In this embodiment, an example is shown in which when the slit 23*a* is formed on the external conductor 23, and the outer peripheral surface thereof is covered with the insulator 24, however, it is enough just to provide a gap between the externally exposed part 21*a* and the external conductor 23 without covering the outer peripheral surface of the slit 23*a* with the insulator 24. The point is that the externally exposed part 21*a* and the external conductor 23 should not be brought into contact with each other, any method may be used to prevent them from coming into contact with each other. However, when a gap is provided between the externally exposed part 21*a* and the external conductor 23, there is a possibility that microwaves may be discharged through the air present in the gap between the slit 23*a* and the externally exposed part 21*a*. Therefore, it is preferable to cover the outer peripheral surface of the slit 23*a* with the insulator 24. In addition, the shape of the slit 23*a* is not limited to the concave shape, and may be any shape.

Further, in this embodiment, a thumb forceps-type instrument is exemplified as the surgical instrument S, but the present invention is not limited thereto, and can be applied to various surgical instruments such as forceps-type instruments and scissors-type instruments. Furthermore, if it is applied to a deep coagulation antenna, it can be applied to a directional tumor coagulation therapy. That is, it can be used with minimal thermal damage to nearby nerves, bile ducts, gallbladders, blood vessels, trachea, ureters, urethra, and the like.

Further, in the present embodiment, an example in which the microwave irradiation parts 20 are respectively provided in a pair of surgical instrument bodies Sa is shown, but the present invention is not limited to this, and a plurality of microwave irradiation parts 20 may be provided in one surgical instrument body Sa. This point will be described with reference to FIG. 3, in which the same reference numerals are given to the same configurations as those described above, and the description thereof will be omitted.

Figure 3A:
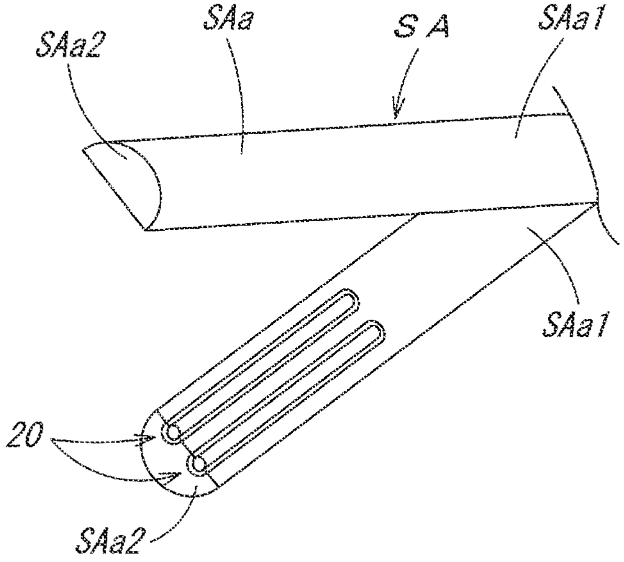
FIG. 3(*a*) is a perspective view of the microwave device according to the same embodiment when the microwave device is applied to a surgical instrument consisting of a forceps-type instrument, and FIG. 3(*b*) is a partially enlarged view of the surgical instrument body according to the same embodiment.
Figure 3B:
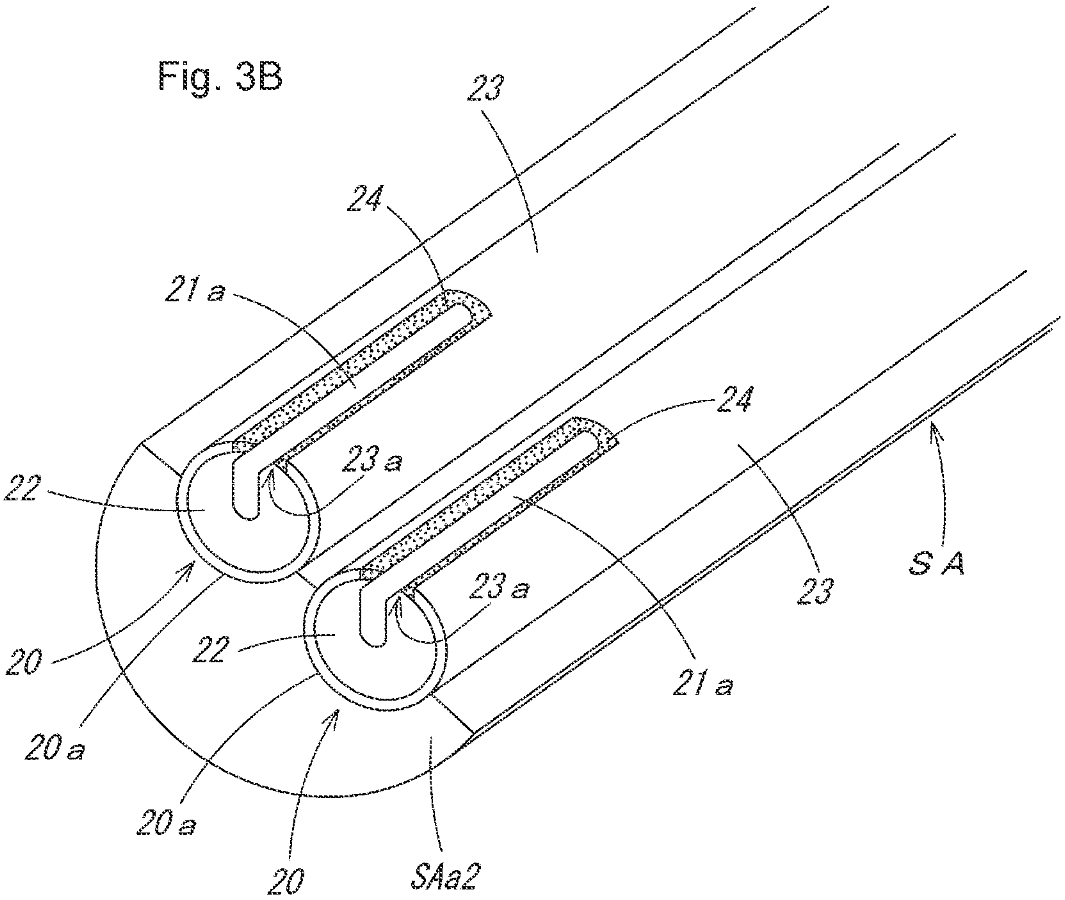

As the surgical instrument SA shown in FIG. 3(*a*), a surgical instrument consisting of a forceps-type instrument is exemplified. The surgical instrument SA is composed of a pair of surgical instrument main bodies SAa each having an elongated elliptical shape. The base ends SAa1 of the pair of surgical instrument bodies SAa are fixed to each other, and the tip ends SAa2 are open. As a result, the pair of surgical instrument bodies SAa can approach and separate from each other, so that the pair of surgical instrument bodies SAa can be used to hold and release biological tissues.

One of thus formed pair of surgical instrument bodies SAa (lower one in FIG. 3(*a*)) is provided with two microwave irradiation parts 20 arranged in parallel. Thus, in this way, when the pair of surgical instrument main body SAa hold biological tissues, and microwaves are radiated at the two microwave irradiation parts 20, better coagulation and hemostasis of biological tissues can be achieved.

Note that FIG. 3 exemplifies a case where one of the pair of surgical instrument bodies SAa (lower one in FIG. 3(*a*)) is provided with two microwave irradiation parts 20 arranged in parallel. However, not limited to this, the other surgical instrument main body Sa (upper one in FIG. 3A) may also have two microwave irradiation parts 20 arranged in parallel.

Figure 4:
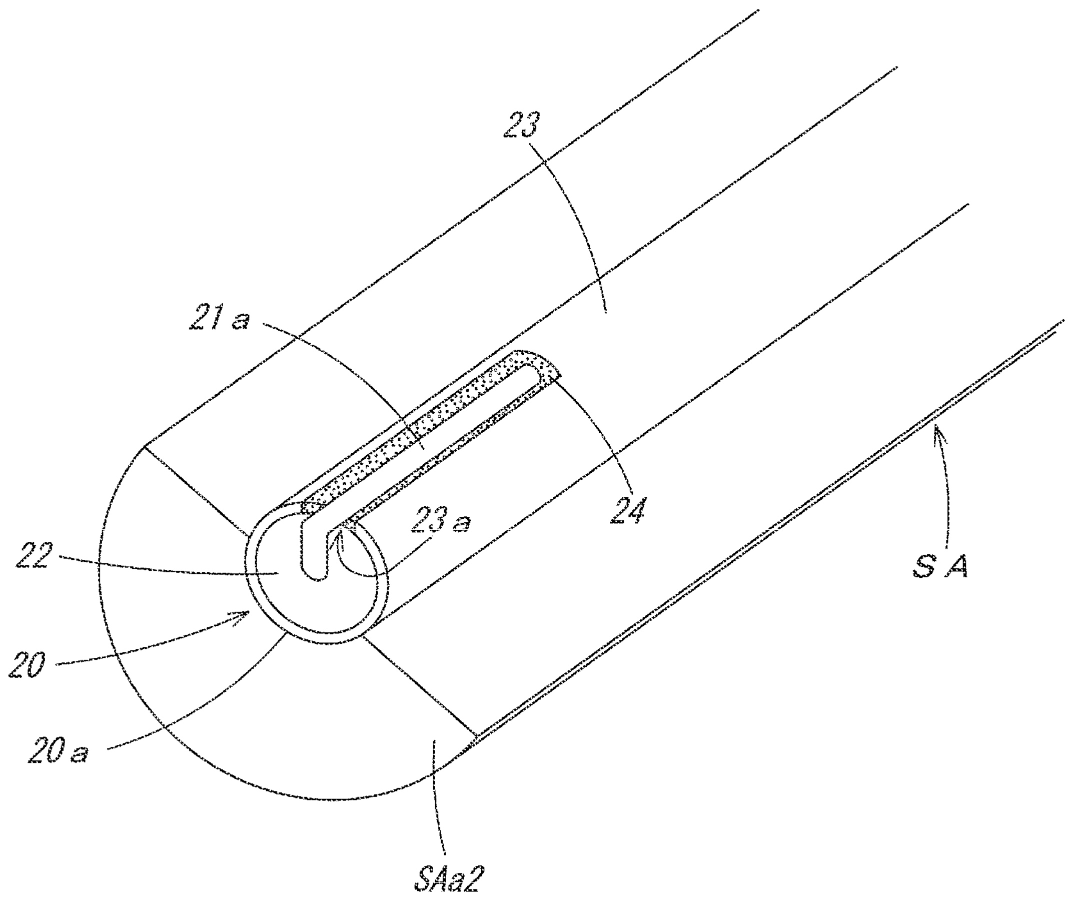
FIG. 4 is a partially enlarged view of a surgical instrument body different from the one shown in FIG. 3, showing a case according to the same embodiment when the microwave device is applied to a surgical instrument consisting of a forceps-type instrument.

Further, FIG. 3 shows an example in which two microwave irradiation parts 20 are arranged in parallel as the surgical instrument SA consisting of a forceps-type instrument, but of course, as shown in FIG. 4, a single microwave irradiation parts 20 may be arranged.

Although not shown in the drawings, a microwave introduction part 10 is provided on the side of the pair of surgical instrument main bodies SAa.

What is claimed is:

1. A microwave device capable of radiating microwaves, comprising:

a central conductor operable to transmit microwaves;

a first insulator covering the central conductor;

an external conductor covering the first insulator;

the central conductor being exposed from a tip end of the microwave device;

an externally exposed part of the central conductor being bent toward a base end side of the microwave device so as to be along the external conductor;

the external conductor having a concave slit formed along an axial direction of the external conductor;

the concave slit comprising right and left wall surfaces along the axial direction of the external conductor; and the externally exposed part of the central conductor being arranged in the concave slit of the external conductor so as to be disposed between the right and left wall surfaces of the concave slit; and an outer peripheral surface of the concave slit being covered with a second insulator, and the second insulator being operable to prevent the externally exposed part of the central conductor from coming into contact with the external conductor.

2. The microwave device of claim 1, wherein:

the externally exposed part of the central conductor is bent so as not to come into contact with the external conductor.

* * * * *